US012551788B2

(12) United States Patent
Meng et al.

(10) Patent No.: US 12,551,788 B2
(45) Date of Patent: Feb. 17, 2026

(54) METHOD, DEVICE, MEDIUM AND COMPUTER PROGRAM PRODUCT FOR CONTROLLING THE MOVEMENT OF A VIRTUAL BODY

(71) Applicant: SHANGHAI LILITH TECHNOLOGY CORPORATION, Shanghai (CN)

(72) Inventors: Hao Meng, Shanghai (CN); Guanyu Feng, Shanghai (CN); Peixuan Huang, Shanghai (CN); Xiaowei Kong, Shanghai (CN); Yujing Lyu, Shanghai (CN); Ming Fang, Shanghai (CN)

(73) Assignee: SHANGHAI LILITH TECHNOLOGY CORPORATION, Shanghai (CN)

( * ) Notice: Subject to any disclaimer, the term of this patent is extended or adjusted under 35 U.S.C. 154(b) by 0 days.

(21) Appl. No.: 19/111,065

(22) PCT Filed: Sep. 15, 2022

(86) PCT No.: PCT/CN2022/119024

§ 371 (c)(1),
(2) Date: Jul. 14, 2025

(87) PCT Pub. No.: WO2024/055239

PCT Pub. Date: Mar. 21, 2024

(65) Prior Publication Data

US 2025/0262535 A1 Aug. 21, 2025

(51) Int. Cl.

*A63F 13/426* (2014.01)
*A63F 13/52* (2014.01)

(Continued)

(52) U.S. Cl.

CPC ............ *A63F 13/426* (2014.09); *A63F 13/52* (2014.09); *A63F 13/56* (2014.09); *A63F 13/573* (2014.09); *A63F 13/837* (2014.09)

(58) Field of Classification Search

CPC ...... A63F 13/426; A63F 13/52; A63F 13/573; A63F 13/57; A63F 13/837; A63F 13/56

(Continued)

(56) References Cited

U.S. PATENT DOCUMENTS

2004/0176163 A1* 9/2004 Ishihata .................. A63F 13/52 463/30
2012/0004017 A1 1/2012 Sakurai et al.
2015/0375110 A1* 12/2015 Volkov .................... A63F 13/30 463/2

FOREIGN PATENT DOCUMENTS

CN 112169325 A 1/2012
CN 109568949 A 4/2019

(Continued)

OTHER PUBLICATIONS

English Translation of International Search Report for PCT/CN2022/119024; mailed Dec. 29, 2022; 3 pages.

(Continued)

*Primary Examiner* — Peter S Vasat
*Assistant Examiner* — Jaymin Jongwoo Baek

(57) ABSTRACT

A method, a device (800), a medium for controlling the movement of a virtual body (107), including: a target determining step, in the first frame, based on the moving direction and position of the virtual body (107), selecting a virtual object (103) in a predetermined area as a virtual target (202); a dynamic adjusting step, calculating a horizontal moving direction (302*a*) of the virtual body (107), a direction of a connecting line between a vertical projection (107'*a*) of the virtual body (107) on the horizontal plane and a vertical projection of the virtual target on the horizontal (Continued)

plane, and an included angle ($\theta_1$) between the horizontal moving direction (302*a*) of the virtual body (107) and the direction of the connecting line in each frame, and controlling the horizontal moving direction (302*a*) of the virtual body (107) based on the included angle ($\theta_1$) (204).

12 Claims, 8 Drawing Sheets

(51) Int. Cl.
*A63F 13/56* (2014.01)
*A63F 13/573* (2014.01)
*A63F 13/837* (2014.01)

(58) Field of Classification Search
USPC ........................................................ 463/31, 2
See application file for complete search history.

(56) References Cited

FOREIGN PATENT DOCUMENTS

| | | | | |
|---|---|---|---|---|
| CN | 109865281 A | | 6/2019 | |
| CN | 110152294 A | * | 8/2019 | ............. A63F 13/53 |
| CN | 111265857 A | | 6/2020 | |
| CN | 111450532 A | | 7/2020 | |

OTHER PUBLICATIONS

Written Opinion of International Searching Authority for CT/CN2022/119024; mailed Dec. 29, 2022; 5 pages.

* cited by examiner

METHOD, DEVICE, MEDIUM AND COMPUTER PROGRAM PRODUCT FOR CONTROLLING THE MOVEMENT OF A VIRTUAL BODY

TECHNICAL FIELD

This invention relates to the field of computer technology, and more particularly, to a method, device, medium and computer program product for controlling the movement of a virtual body.

BACKGROUND

As the design of shooting games becomes more and more diverse, players are experienced with a variety of weapons. For example, in addition to the simulation of a real firearm in a conventional shooting game, various special-effect shooting weapons, such as an energy bullet weapon, are present in the shooting game. Unlike conventional solid bullet weapons, these special-effect shooting weapons can have various effects such as charging, overheating property, and the like. However, the ballistic algorithms of the prior art are mainly aimed at conventional shooting weapons, whose algorithms are relatively fixed, limiting the flexibility to achieve various effects. In addition, in the prior art, the trajectory and the hit condition of the bullet are determined by the initial state when the user shoots, and the trajectory is too single for the user, and the difficulty in hitting the target is greatly increased, particularly for a novice user. This requires redesigning the characteristics and algorithms of such weapons to solve the above problems.

SUMMARY

The purpose of this invention is to provide a method, device, medium and computer program product for controlling the movement of a virtual body, and to solve the technical problem that the algorithms for performing this type of new weapon are rather complex and relatively fixed in the prior art.

An embodiment of this invention discloses a method for controlling the movement of a virtual body applied to an electronic device, including:

a target determining step, in the first frame, based on the moving direction and position of the virtual body, selecting a virtual object in a predetermined area as a virtual target;

a dynamic adjusting step, calculating a horizontal moving direction of the virtual body, a direction of a connecting line between a vertical projection of the virtual body on the horizontal plane and a vertical projection of the virtual target on the horizontal plane, and an included angle between the horizontal moving direction of the virtual body and the direction of the connecting line in each frame, and controlling the horizontal moving direction of the virtual body based on the included angle.

Optionally, wherein the dynamic adjusting step further includes:

if the included angle is less than a predetermined angle threshold, controlling the horizontal moving direction of the virtual body to deflect a predetermined angle toward the direction of the connecting line based on the horizontal moving direction of the virtual body in the previous frame;

if the included angle is greater than or equal to the predetermined angle threshold, controlling the horizontal moving direction of the virtual body to be the horizontal moving direction of the virtual body in the previous frame.

Optionally, wherein the dynamic adjusting step further includes:

if the included angle is less than the predetermined angle, which controlling the horizontal moving direction of the virtual body to deflect an angle toward the direction of the connecting line based on the horizontal moving direction of the virtual body in the previous frame, wherein the deflected angle is equal to the included angle.

Optionally, further including a charge operation step:

receiving a charge operation of a user, there is a predetermined relationship between the predetermined angle and the frame number, and the predetermined angle is positively correlated with the duration of the charge operation.

Optionally, wherein the target determining step further includes: the vertical projection of the predetermined area on the horizontal plane is a sector area, wherein the sector area has a predetermined central angle, an angle bisector of the sector area is parallel to the horizontal moving direction of the virtual body in the first frame, the sector area takes the predetermined firing range of the virtual body as the radius, and takes the vertical projection of the position of the virtual body on the horizontal plane in the first frame as the apex.

Optionally, wherein in the target determining step, selecting a virtual object in a predetermined area as a virtual target includes:

selecting a virtual object within the predetermined area, which has no obstacles between the positions of the virtual object and the virtual body in the first frame, and the vertical projection of whose position on the horizontal plane is the closest to the vertical projection of the position of the virtual body on the horizontal plane in the first frame, as the virtual target.

Optionally, further including a charge operation step:

receiving a charge operation of a user, the velocity magnitude of the virtual body in the first frame is positively correlated with the duration of the charge operation, and the velocity magnitude of the virtual body decays in a predetermined proportion with time, and when the velocity magnitude of the virtual body is 0, stop controlling the movement of the virtual body.

Optionally, further including a charge operation step:

receiving a charge operation of a user, creating the virtual body after the charge operation ends if the duration of the charge operation does not reach a predetermined duration threshold, when the duration of the charge operation reaches the predetermined duration threshold, entering a cooling time, and not responding the charge operation within the cooling time.

Optionally, further including:

the movement parameters of the virtual body in the vertical direction are calculated according to the law of parabolic movement.

Optionally, further including:

controlling the vertical moving direction of the virtual body to deflect based on the position of the virtual target so that the moving direction of the virtual body is more toward the virtual target.

An embodiment of this invention discloses a device for controlling the movement of a virtual body, the device including a processor and a memory storing computer-executable instructions which, when executed by the processor, cause the device to implement the method for controlling the movement of a virtual body according to the embodiment of this invention.

An embodiment of this invention discloses a computer storage medium having stored thereon instructions which, when run on a computer, cause the computer to perform the method for controlling the movement of a virtual body according to the embodiment of this invention.

An embodiment of this invention discloses a computer program product including computer-executable instructions executed by a processor to implement the method for controlling the movement of a virtual body according to the embodiment of this invention.

Compared with the prior art, the embodiments of this invention have the following main differences and effects:

In this invention, the target can be automatically selected, and the launched virtual body gradually corrects the flight direction toward the target during the flight, so that when the invention is used for a special-effect shooting weapon in a game, the effect of tracking bullet is achieved. And it is to correct the flight direction of the virtual body in the horizontal direction, so as to achieve the tracking of the target in the horizontal direction. Since in many shooting games, the target (enemy) mostly moves horizontally, the algorithm only corrects the flight direction of the flight object (bullet) in the horizontal direction, thereby reducing the calculation amount while achieving good tracking effect. Meanwhile, the algorithm is concise and the corresponding relationship between the predetermined horizontal angle of deflection and the frame number can be customized arbitrarily, and the flexibility is high. It is possible to achieve the effect of gradually deflecting the virtual body toward the target according to the real-time relative position between the virtual body and the target, and at the same time, the failure effect of tracking is achieved, so that the game characteristic is enhanced when the invention is used for a special-effect shooting weapon in a game. It is possible to automatically select a target in front of (or near a crosshair) the virtual body launcher (weapon) in order to track the target and enhance the game effect when this invention is used for a special-effect shooting weapon in a game. It is possible to automatically select the closest target and avoid hitting the bunker or wounding the teammates due to the virtual body tracking function. The correction angle of the virtual body can be prevented from being too large. It is possible to change the tracking ability of the virtual body through the charging, and enhance the game effect when this invention is used for a special-effect shooting weapon in a game. It is possible to change the initial speed of the virtual body by charging, and enhance the game effect when this invention is used for a special-effect shooting weapon in a game. It is possible to achieve an overheating effect caused by charge, and to achieve an overheating effect of a virtual body launcher (weapon) when this invention is used in a special-effect shooting weapon in a game, thereby enhancing the game effect. The trajectory of the virtual body can be made more natural. The tracking effect of the virtual body in the vertical direction can be achieved.

DETAILED DESCRIPTION

To make the objectives, technical solutions, and advantages of the present application clearer, the following further describes the embodiments of the present application in detail with reference to the accompanying drawings.

Figure 1:
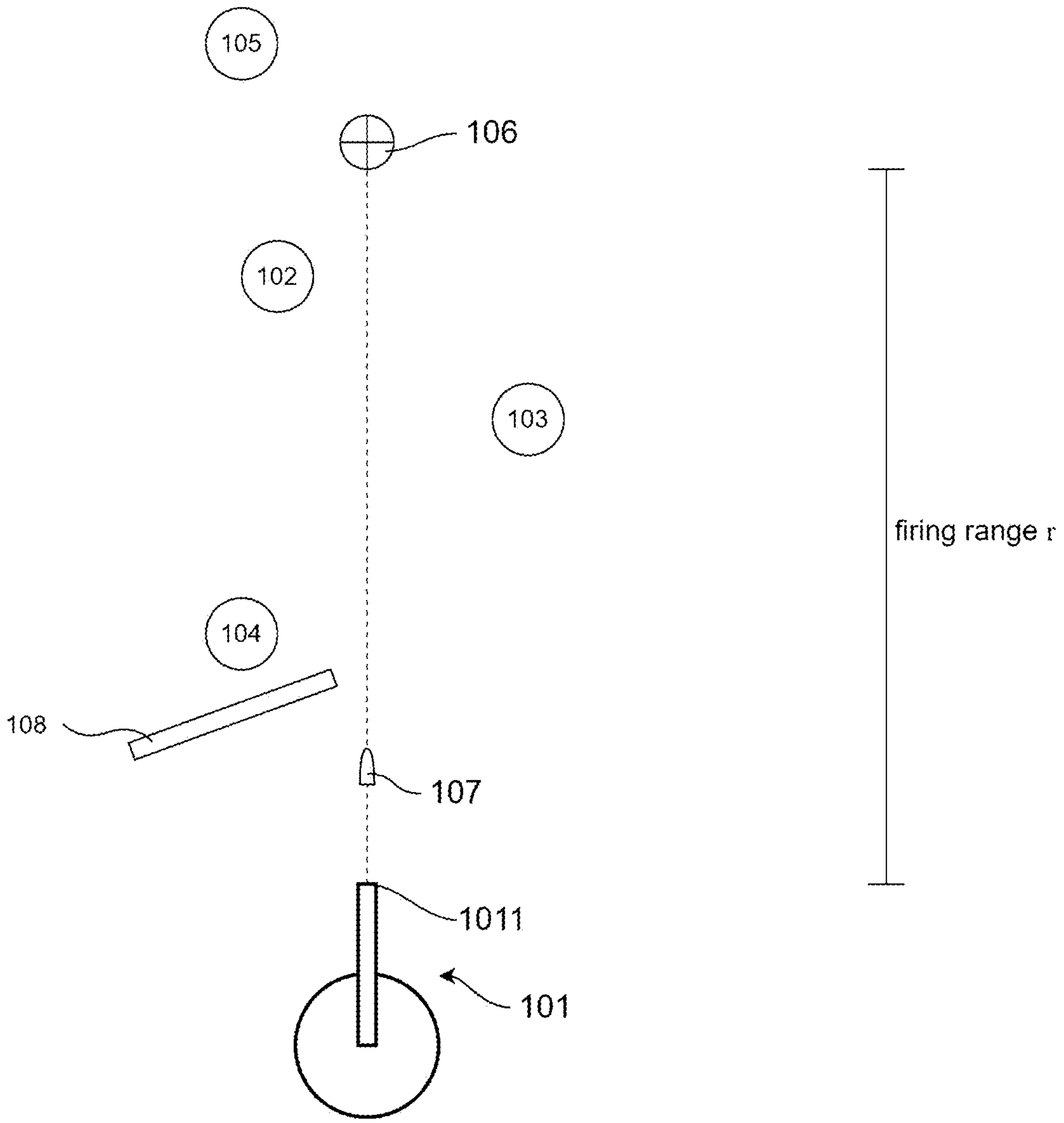
FIG. 1 illustrates, from a top perspective, a virtual scene in which a method for controlling the movement of a virtual body according to an embodiment of this invention is implemented.

FIG. 1 illustrates, from a top perspective, a virtual scene 100 in which a method for controlling the movement of a virtual body according to an embodiment of the present application is implemented, which includes a launcher 101, moving virtual objects 102-105, and a virtual obstacle 108, and the launcher 101 can launch a virtual body 107, for example, a virtual bullet, towards the crosshair 106 through its own launch port 1011. The launcher 101 is a new type of shooting weapon, this new type of shooting weapon can be different from the traditional shooting weapon of the simulation of real firearms, and can launch special-effect bullets with tracking abilities. For example, bullet 107 tracks one or more of virtual objects 102-105. In the prior art, the ballistic calculation of traditional shooting weapons is achieved, but its algorithm is relatively fixed, which limits the flexibility of realizing various effects, and cannot achieve the effect of virtual bullet dynamically tracking the target.

Figure 2:
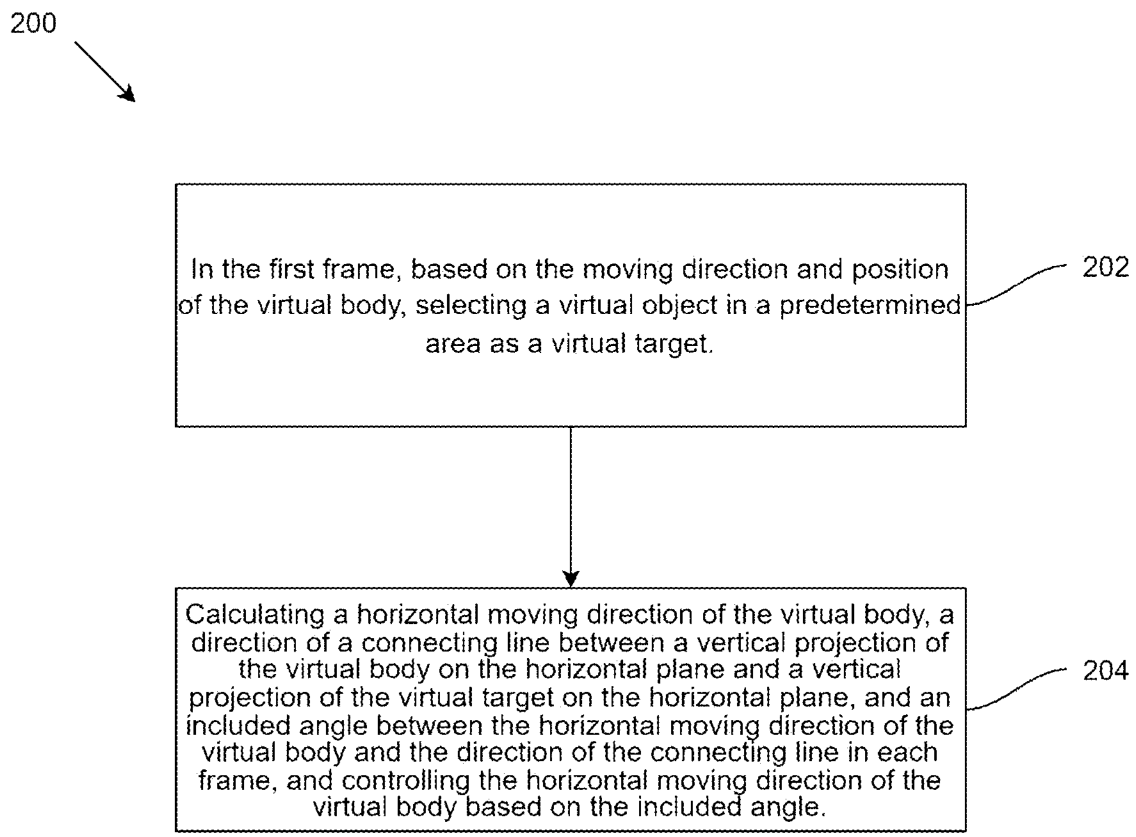
FIG. 2 illustrates a flowchart of a method for controlling the movement of a virtual body according to an embodiment of this invention.

In order to solve the above technical problems in the prior art, and to endow this type of weapon with new characteristics, the present application provides a method for controlling the movement of a virtual body, and FIG. 2 illustrates a flowchart 200 of the method for controlling the movement of a virtual body according to an embodiment of the present application, an example embodiment of the method 200 for controlling the movement of a virtual body is described below in conjunction with FIG. 1 and FIG. 2, the method 200 includes:

- a target determining step 202, In the first frame, based on the moving direction and position of the virtual body, selecting a virtual object in a predetermined area as a virtual target.

For example, in a scene where a player plays a shooting game through a terminal, the terminal displays to the player a crosshair 106 corresponding to the launcher 101, which identifies the orientation of the launch port 1011 of the launcher 101, or identifies the target position of the bullet fired by the launcher 101 in the first frame at which the bullet starts to move, that is, the initial velocity direction of the bullet. The player can control the position of the crosshair 106 by inputting operations through the terminal, and make the launcher 101 launch the virtual body 107, that is, the bullet 107. The bullet 107 has a certain firing range, that is, it disappears, stops or falls to the ground after reaching a predetermined distance. The launching of the virtual body 107 mentioned here may mean creating the virtual body 107 at the location of the launching port 1011 and making the virtual body 107 move according to specific rules. Here, the frame when the virtual body 107 is created is referred to as the first frame. In the first frame, select a virtual object in a predetermined area in the virtual space as the virtual target, for example, select the virtual object 103 as the virtual target to be tracked by the bullet 107, and this selecting operation is completed by a computer program rather than a user operation. Wherein, the virtual object here may be an enemy in the game scene.

One skilled in the art can understand that a virtual object in a predetermined area may also be selected as a virtual target in frames before or after the first frame.

A dynamic adjusting step 204, calculating a horizontal moving direction of the virtual body, a direction of a connecting line between a vertical projection of the virtual body on the horizontal plane and a vertical projection of the virtual target on the horizontal plane, and an included angle between the horizontal moving direction of the virtual body and the direction of the connecting line in each frame, and controlling the horizontal moving direction of the virtual body based on the included angle.

Figure 3:
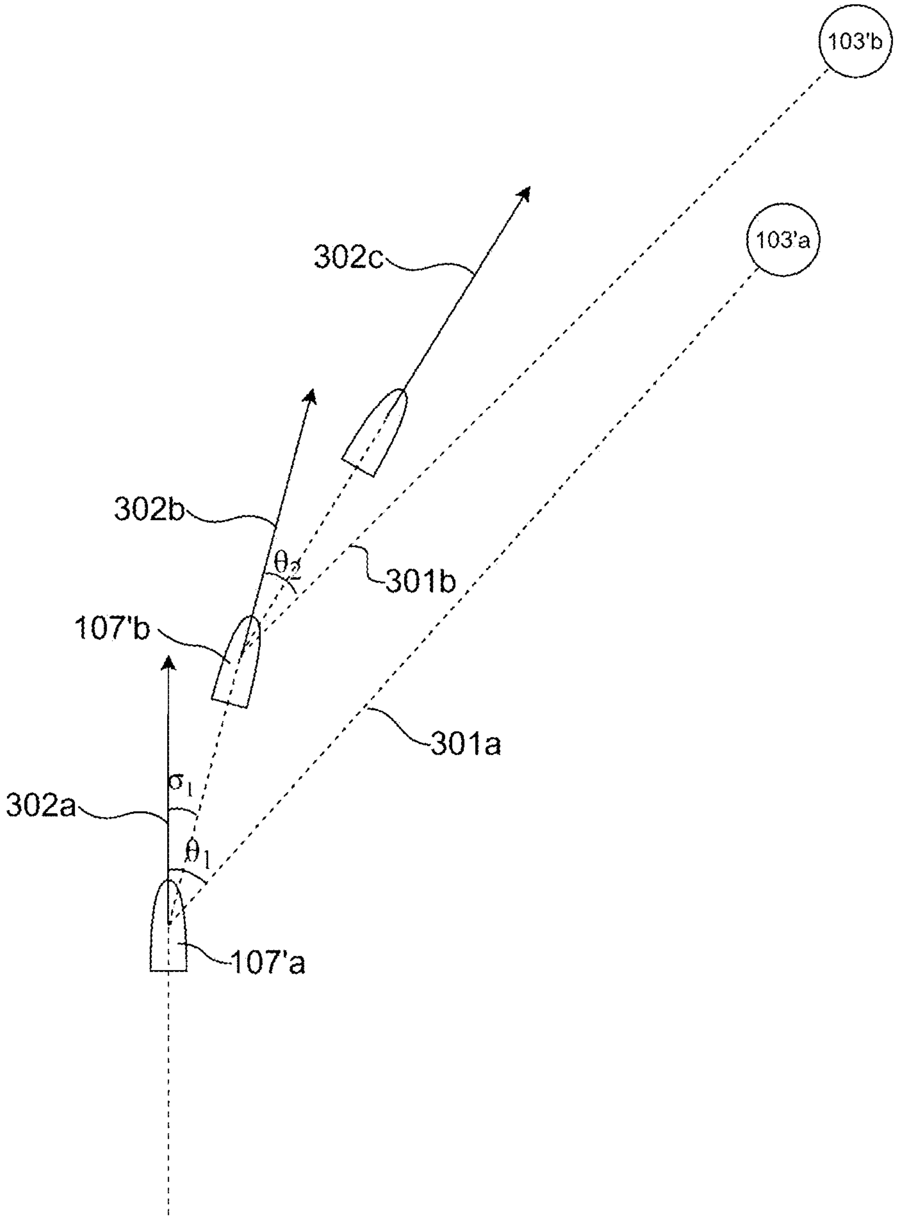
FIG. 3 shows a schematic diagram of a dynamic adjusting step according to an embodiment of this invention.

For example, FIG. 3 shows the vertical projection of the bullet 107 on the horizontal plane and the vertical projection of the virtual object 103 on the horizontal plane, and the moving direction of the vertical projection of the bullet 107 on the horizontal plane is represented by a directed line segment or vector. The horizontal plane may be the ground, the horizontal plane where the bullet 107 is located in the first frame, the horizontal plane where the virtual target is located in the first frame, or any other suitable horizontal plane. In the Nth frame, the line between the vertical projection 107'*a* of the bullet 107 on the horizontal plane and the vertical projection 103'*a* of the virtual object 103 on the horizontal plane is 301*a*, the moving direction of the projection 107'*a* is 302*a*, and the included angle between the horizontal moving direction of the bullet 107 and the direction of connecting line is the included angle $\theta_1$ between the moving direction 302*a* and the connecting line 301*a*. Then, based on the included angle $\theta_1$, the horizontal moving direction of the bullet 107 is adjusted so that the moving direction of the bullet 107 on the vertical projection of the horizontal plane is deflected toward the direction of the connecting line 301*a*, and is deflected into the moving direction 302*b*. Therefore, in the N+1th frame, the virtual object 103 may have moved, and its vertical projection on the horizontal plane is 103'*b*, and the connecting line between the vertical projection 107'*b* of the moved bullet 107 on the horizontal plane and the vertical projection 103'*b* of the virtual object 103 on the horizontal plane is 301*b*, the moving direction of the projection 107'*b* is 302*b*, and the included angle between the horizontal moving direction of the bullet 107 and the direction of connecting line is the included angle $\theta_2$ between the moving direction 302*b* and the connecting line 301*b*. Then, based on the included angle $\theta_2$, the horizontal moving direction of the bullet 107 is adjusted so that the moving direction of the bullet 107 on the vertical projection of the horizontal plane is deflected toward the direction of the connecting line 301*b*, and is deflected into the moving direction 302*c*. Subsequent frames are also deduced by analogy, so that in each frame, the moving direction of the vertical projection of the bullet 107 on the horizontal plane is deflected toward the vertical projection of the virtual object 103 on the horizontal plane, that is, the horizontal moving direction of the bullet 107 is dynamically deflected toward the virtual object 103, achieving the dynamic tracking effect of the bullet in the horizontal direction.

In this invention, the virtual target can be automatically selected, and the launched virtual body gradually corrects the flight direction toward the virtual target during the flight, so that when the method is used for a special-effect shooting weapon in a game, the effect of tracking bullet is achieved. And in this embodiment, it is to correct the flight direction of the virtual body in the horizontal direction, so as to achieve the tracking of the target in the horizontal direction, since in many shooting games, the target (enemy) mostly moves horizontally, the algorithm only corrects the flight direction of the flight object (bullet) in the horizontal direction, thereby reducing the calculation amount while achieving good tracking effect, the computational burden of the device is reduced. Meanwhile, the algorithm is concise and the corresponding relationship between the predetermined horizontal angle of deflection and the frame number can be customized arbitrarily, and the flexibility is high.

Figure 4:
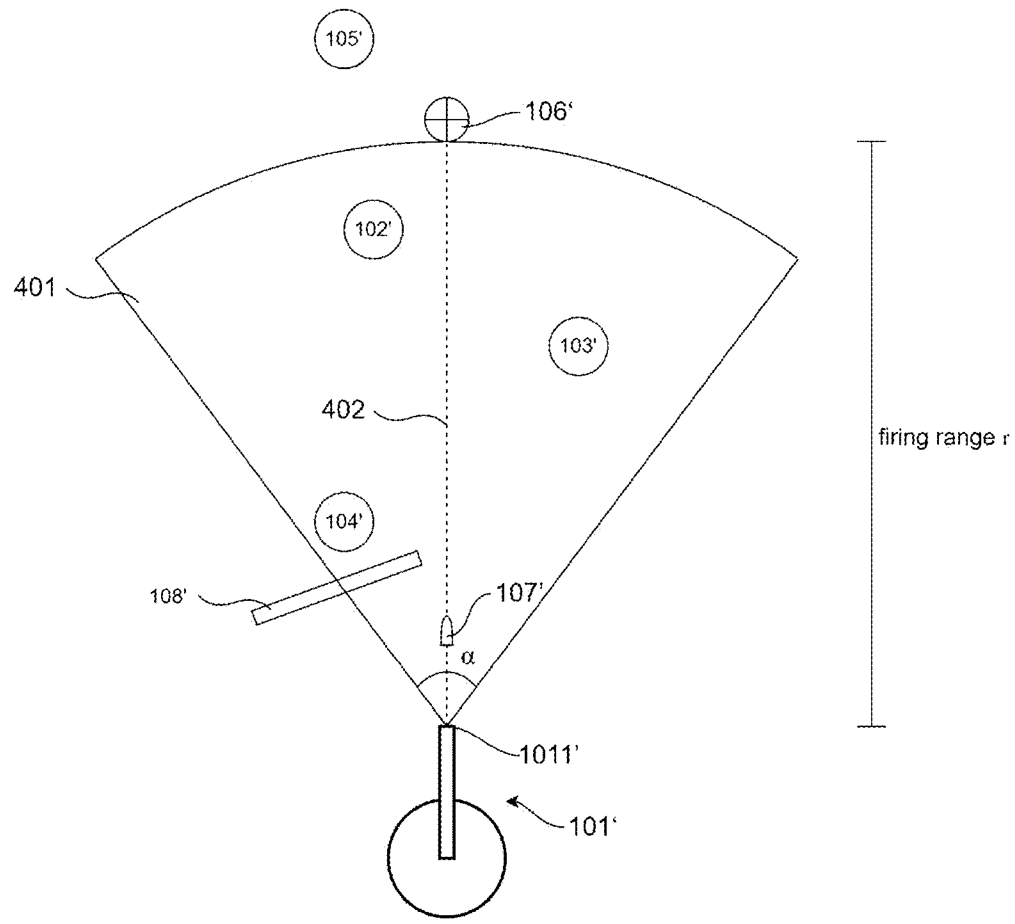
FIG. 4 shows a schematic diagram of a target determining step according to an embodiment of this invention.

According to some embodiments of the present application, wherein the target determining step 202 further includes: the vertical projection of the predetermined area on the horizontal plane is a sector area, wherein the sector area has a predetermined central angle, an angle bisector of the sector area is parallel to the horizontal moving direction of the virtual body in the first frame. The sector area takes the predetermined firing range of the virtual body as the radius, and takes the vertical projection of the position of the virtual body on the horizontal plane in the first frame as the apex; For example, as shown in FIG. 4, in any horizontal plane, the vertical projections of the launcher 101 and its launching port 1011 on the horizontal plane are 101' and 1011' respectively, the vertical projection of the crosshair 106 on the horizontal plane is 106', and the vertical projection of the bullet 107 on the horizontal plane is 107'. Then the vertical projection of the predetermined area in the horizontal plane is a sector area 401; the sector area 401 has a predetermined central angle $\alpha$; the angle bisector 402 of the sector area 401 is parallel to the horizontal motion direction of the bullet 107 in the first frame, or parallel to the moving direction of the bullet projection 107', or parallel to the connecting line between the launch port projection 1011' and the crosshair projection 106'. The sector area 401 takes the predetermined firing range r of the bullet 107 as a radius, and the firing range r here can be the preset maximum horizontal distance that allows the bullet 107 to reach, that is, the maximum distance that allows the bullet projection 107' to move. The bullet can disappear when the bullet 107 reaches the firing range, or the horizontal distance of the bullet 107 when it falls on the ground is equal to the firing range by certain rules; the sector area 401 takes the bullet projection 107' or launch port projection 1011' in the first frame as the apex. The predetermined area may be a three-dimensional space formed after the sector area 401 is stretched for a certain distance in the vertical direction, and the three-dimensional space can accommodate one or more virtual objects. Such a sector area 401 defines a range in the first frame at a certain angle in front of the bullet projection 107' or the launch port projection 1011' and within the firing range of the bullet.

According to some embodiments of the present application, wherein selecting a virtual object in a predetermined area as a virtual target includes:

selecting a virtual object within the predetermined area, which has no obstacles between the positions of the virtual object and the virtual body in the first frame, and the vertical projection of whose position on the horizontal plane is the closest to the vertical projection of the position of the virtual body on the horizontal plane in the first frame, as the virtual target. For example, as shown in FIG. 4, the vertical projections of the moving virtual objects 102-105 on the horizontal plane are 102'-105', and the vertical projection of the virtual obstacle 108 on the horizontal plane is 108'. The position of the bullet projection 107' in the first frame is the position of the launch port projection 1011'. Among the virtual object projections 102'-105', the virtual object projection 104' is the closest to the launch port projection 1011'. However, as shown in FIG. 1, there is a virtual obstacle 108 between the virtual object 104 and the launch port 1011, and the height of the virtual obstacle 108 in the vertical direction can be set to be the same as the predetermined area. Correspondingly, for the convenience of illustration, there is also a virtual obstacle projection 108' between the virtual object projection 104' and the launch port projection 1011', so the virtual object 104 is not selected as a virtual target. After excluding the virtual object projection 104', the virtual object projection 103' is the closest to the launch port projection 1011', and there is no virtual obstacle between the virtual object 103 and the launch port 1011, then the virtual object 103 is selected as the virtual target. The virtual obstacle 108 here may be a bunker, a building or any other object in the shooting game scene, and may also be a friendly unit.

In this invention, it is possible to automatically select a target within the firing range in front of (or near a crosshair) the virtual body launcher (weapon) in order to make the bullet track the target and enhance the game effect when this method is used for a special-effect shooting weapon in a game. And it is possible to automatically select the closest target and avoid hitting the bunker or wounding the teammates due to the virtual body tracking function.

According to some embodiments of the present application, the dynamic adjusting step 204 further includes:

if included angle between the horizontal moving direction of the virtual body and the direction of connecting line between the vertical projection of the virtual body on the horizontal plane and the vertical projection of the virtual target on the horizontal plane is less than a predetermined angle threshold, controlling the horizontal moving direction of the virtual body to deflect a predetermined angle toward the direction of the connecting line based on the horizontal moving direction of the virtual body in the previous frame. If the included angle is greater than or equal to the predetermined angle threshold, controlling the horizontal moving direction of the virtual body to be the horizontal moving direction of the virtual body in the previous frame.

For example, the predetermined angle threshold can be set to 90°, as shown in FIG. 3, in the Nth frame, the included angle between the horizontal moving direction 302*a* of the bullet 107 and the connecting line 301*a* is $\theta_1$, and $\theta_1<90°$, for example $\theta_1=45°$, then, controlling the horizontal moving direction of the bullet 107 in the N+1th frame to deflect a predetermined angle σ' in the horizontal plane to the direction of the connecting line 301*a*, based on the horizontal moving direction 302*a* in the previous frame, that is, the moving direction 302*b* of the projection 107'*b* in the N+1th frame is deflected by a predetermined angle $\sigma_1$ in the direction of the connecting line 301*a* relative to the moving direction 302*a* of the projection 107'*a* in the Nth frame.

The predetermined angle σ' can be calculated according to a configuration curve, and the configuration curve refers to a relationship curve between the frame number and the predetermined angle σ'. The configuration curve can be directly preset by the developer, or it can be a development function provided by a game engine, such as Unreal 4 (UE4), which supports developers to configure the target curve according to the time dimension. For example, the abscissa of the configuration curve is the time axis or frame number, and the ordinate is the predetermined angle σ'. The configuration curve can be various function curves set according to the development purpose, such as quadratic function curve, parabola, etc., or it can be a non-function curve, that is, an artificial "curve" formed by manually entering coordinates. In the simplest case, the predetermined angle σ' can be a fixed value, that is, the configuration curve is a horizontal straight line. After the configuration curve is preset, according to the configuration curve, each time or frame number corresponds to a predetermined angle σ', and the corresponding target value (ordinate), that is, the value of the predetermined angle σ', can be obtained according to the time coordinate or frame number coordinate (abscissa) during the running of the game. The ordinate of the configuration curve can also be the deflection angular velocity δ' in the horizontal plane, and the unit of δ' can be degree/second (°/s), that is, the angle value of the deflection per second. Alternatively, the ordinate of the configuration curve can also be the cumulative deflection angle φ' in the horizontal plane, and accordingly, the deflection angular velocity $$\delta' = \frac{d\varphi'}{dt}$$

can also be calculated through derivation, where t represents time. Assume that the velocity of the bullet is k, and the unit of k can be m/s (m/s), the direction of movement of the bullet in three-dimensional space is a vector d, the direction of the connecting line between the bullet and the virtual target is a vector τ, and the number of frames per second is f. Then the bullet moves k/f towards its moving direction d in each frame, and updates and calculates the deflection angle σ in the three-dimensional space of d towards τ at each frame, where σ=δ/f, where δ represents the deflection angular velocity of the virtual body in the three-dimensional space, and then calculates the vertical projection σ' of σ on the horizontal plane, or directly calculates the deflection angle σ' that updates the horizontal component of d towards the horizontal component of τ in each frame.

Figure 5:
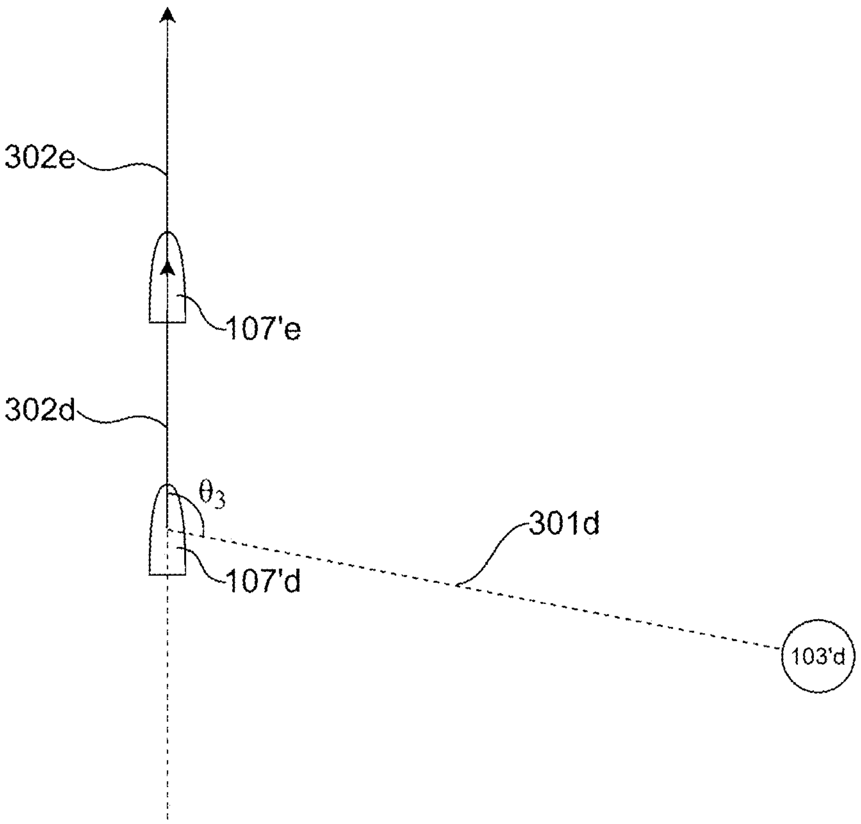
FIG. 5 shows a schematic diagram of a dynamic adjusting step according to an embodiment of this invention.

And if in a certain frame, for example, the Mth frame, as shown in FIG. 5, the connecting line between the vertical projection 107'*d* of the bullet 107 on the horizontal plane and the vertical projection 103'*d* of the virtual object 103 on the horizontal plane is 301*d*, the moving direction of the projection 107'*d* is 302*d*, the included angle between the horizontal moving direction of the bullet 107 and the connecting line is the included angle $\theta_3$ between the moving direction 302*d* and the connecting line 301*d*, and $\theta_3 \geq 90°$, for example, $\theta_3=105°$. Then control the horizontal moving direction of the bullet 107 in the M+1th frame to be the same as the horizontal moving direction 302*d* in the previous frame, that is, the moving direction 302*e* of the vertical projection 107'*e* of the bullet 107 on the horizontal plane in the M+1th frame is the same as the moving direction 302*d* of the projection 107'*d* in the Mth frame. And in subsequent frames, the bullet 107 is no longer controlled to deflect in the horizontal direction, that is, the bullet 107 is no longer controlled to deflect toward the virtual object 103. That is to say, the bullet 107 no longer tracks the virtual target 103, achieving the failure effect of tracking.

In this invention, it is possible to achieve the effect of gradually deflecting the virtual body toward the target object according to the real-time relative position between the virtual body and the target object, and at the same time, the failure effect of tracking is also taken into account, so that the fun of the game is enhanced when the method is used for a special-effect shooting weapon in a game.

Figure 6:
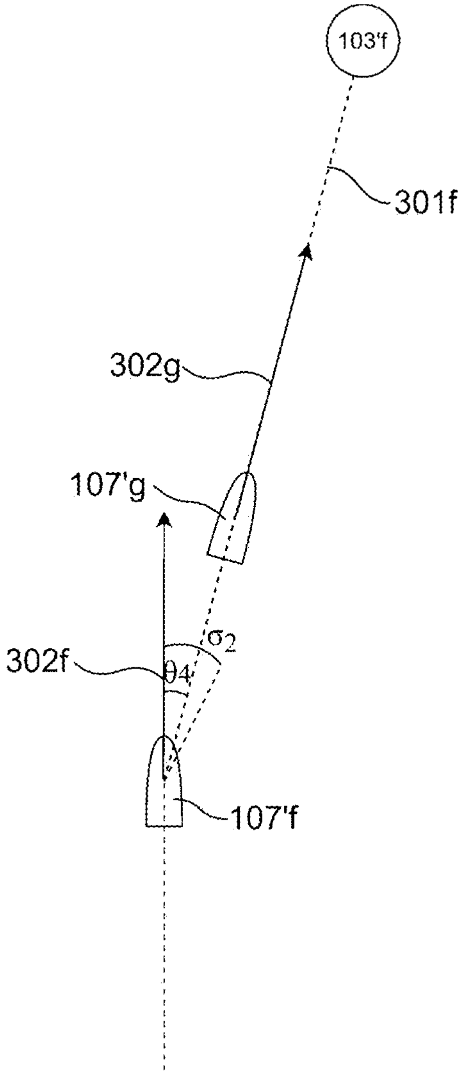
FIG. 6 shows a schematic diagram of a dynamic adjusting step according to an embodiment of this invention.

According to some embodiments of the present application, the dynamic adjusting step 204 further includes:

if the included angle is less than the predetermined angle, which controlling the horizontal moving direction of the virtual body to deflect an angle toward the direction of the connecting line based on the horizontal moving direction of the virtual body in the previous frame, wherein the deflected angle is equal to the included angle. As shown in FIG. 6, at the Pth frame, the connecting line between the vertical projection 107'*f* of the bullet 107 on the horizontal plane and the vertical projection 103'*f* of the virtual object 103 on the horizontal plane is 301*f*, and the included angle between the horizontal moving direction 302*f* of the bullet 107 and the connecting line 301*f* is $\theta_4$. According to the configuration curve, the deflection angle $\sigma_2$ corresponding to the Pth frame is calculated, and $\sigma_2>\theta_4$, then control the horizontal moving direction of the control bullet 107 in the P+1th frame to deflect toward the direction of the connecting line 301*f* by $\theta_4$, based on the horizontal moving direction 302*f* in the previous frame, that is, make the moving direction 302*g* of the projection 107'*g* in the P+1th frame is deflected toward the direction of the connecting line 301*f* by $\theta_4$ relative to the moving direction 302*f* of the projection 107'*f* in the Pth frame. Because $\sigma_2>\theta_4$, if the horizontal moving direction of the bullet 107 in the P+1th frame is deflected to the direction of the connection line 301*f* by $\sigma_2$ based on the horizontal moving direction 302*f* in the previous frame, the correction angle of the bullet 107 will be too large, and instead deviate from the direction of the virtual object 103.

According to some embodiments of the present application, the method also includes a charge operation step:

receiving a charge operation of a user, there is a predetermined relationship between the predetermined angle and the frame number, and the predetermined angle is positively correlated with the duration of the charge operation.

For example, before the first frame, the terminal receives a charge operation from the user. The charge operation may be an operation with a certain duration performed by the user on the terminal, such as a long-press touch operation on a smart phone. In each frame, the deflection angle σ' of the bullet 107 is positively correlated with the duration of the charging operation, that is, the tracking ability of the bullet 107 increases with the duration of the charge operation.

In this invention, it is possible to change the tracking ability of the virtual body through the charging, and enhance the game effect when the invention is used for a special-effect shooting weapon in a game.

According to some embodiments of the present application, the method also includes a charge operation step:

receiving a charge operation of a user, the velocity magnitude of the virtual body in the first frame is positively correlated with the duration of the charge operation, and the velocity magnitude of the virtual body decays in a predetermined proportion with time, and when the velocity magnitude of the virtual body is 0, stop controlling the movement of the virtual body. In other embodiments of the present application, a minimum speed threshold can also be set, and when the speed of the virtual body decreases to the minimum speed threshold, stop the control of the movement of the virtual body, or the system stops simulating the trajectory of the virtual body.

For example, before the first frame, the terminal receives the charge operation from the user, and determining the velocity $k_0$ that is, the initial velocity, of the bullet 107 in the first frame according to the duration of the charge operation. In subsequent frames, the velocity k of the bullet 107 decreases as the frame number increases until the velocity k=0, which means the bullet 107 reaches the firing range. At this time, stop the control of the movement of the bullet 107. It can be understood that, in this embodiment, the firing range of the bullet 107 is positively correlated with the velocity $k_0$ of the bullet 107 in the first frame, that is, the firing range of the bullet 107 is also positively correlated with the duration of the charge operation. In other embodiments of the present application, the vertical free fall of the virtual body can also be considered. When the virtual body falls to the ground, even if the horizontal speed does not drop to 0, it will still be judged to end the movement process.

Changing the initial speed of the virtual body by charging, and enhance the game effect when the invention is used for a special-effect shooting weapon in a game.

According to some embodiments of the present application, the method also includes a charge operation step:

receiving a charge operation of a user, creating the virtual body after the charge operation ends if the duration of the charge operation does not reach a predetermined duration threshold, when the duration of the charge operation reaches the predetermined duration threshold, entering a cooling time, and not responding the charge operation within the cooling time.

For example, before the first frame, the terminal receives a charge operation from the user, and if the duration of the charge operation does not reach the predetermined duration threshold, create the bullet 107 at the launch port 1011 when the charge operation ends. And once the duration of the charge operation reaches the predetermined duration threshold, it is determined that the launcher 101 is overheated and immediately enters a cooling time. During the cooling time, even if the terminal receives a charge operation or a launch operation from the user, it will not respond to these operations, that is, during the cooling time, the launcher 101 cannot launch the bullet 107.

Achieving an overheating effect caused by charge, and to achieve an overheating effect of a virtual body launcher (weapon) when the invention is used in a special-effect shooting weapon in a game, thereby enhancing the game effect.

In order to better illustrate the application of the technical solution protected by this application in shooting games, with reference to FIG. 4, FIG. 5, and FIG. 6, in another embodiment of this application, the vertical projection of the predetermined area in FIG. 4 on the horizontal plane is sector area 401, the central angle α of the sector area 401 is 60°, and in FIG. 5, the predetermined angle threshold is 30°, which is half of the central angle α, which means that the included angle between the direction of the connecting line between the vertical projection 1011' of the virtual body on the horizontal plane and the vertical projection of the virtual objects (such as 102', 103') in the predetermined area on the horizontal plane and the horizontal movement direction of the virtual body must be less than or equal to 30° so that the virtual object can be effectively tracked. If there is a virtual object outside the sector area 401, the included angle between the direction of the connecting line between the virtual object and the vertical projection 1011' of the virtual body on the horizontal plane and the horizontal moving direction of the virtual body must be greater than the predetermined angle threshold, that is, virtual objects outside the sector area 401 will not be tracked. In this embodiment, each frame is preset with a fixed predetermined angle of 5°, and the preset duration of charge operation corresponds to a charge coefficient table. The longer the charge operation is, the greater the charge coefficient is. If the charging is from 0 seconds to a predetermined duration threshold (such as 5 seconds), the corresponding charge coefficient is 0.5 to 2.5, and the final deflection angle of the virtual body on the horizontal plane in each frame is equal to the predetermined angle multiplied by the charge coefficient. That is, when the predetermined angle is 5°, the charge coefficient is 1.5, and the actual deflection angle is 7.5°. As the deflection operation is performed on the virtual body in each frame, the situation in FIG. 6 will appear at a certain frame, that is, the included angle $\theta_4$ between the direction of the connecting line 301*f* between the vertical projection 107*f* of the virtual body on the horizontal plane and the vertical projection 103*f* of the virtual target on the horizontal plane between the horizontal moving direction 302*f* of the virtual body is 3°, which is less than the predetermined angle $\sigma_2$ of 5° corresponding to the frame. Then, in order to avoid overcorrection, the actual deflection angle executed in this frame is $\theta_4$, so that the virtual body 107*f* hit the virtual target 103*f* as soon as possible.

According to some embodiments of the present application, the method further includes:

the movement parameters of the virtual body in the vertical direction are calculated according to the law of parabolic movement. The trajectory of the virtual body can be made more natural. That is, the movement parameters of the virtual body in the horizontal direction are calculated according to the aforementioned embodiments, and the movement parameters in the vertical direction are calculated according to the law of parabolic movement. According to the vertical speed of the virtual body in the first frame (which may be vertically up, vertically down, or 0), changes in each frame according to the effect of gravity, matches the characteristics of ballistics in the real world.

According to some embodiments of the present application, the method further includes:

controlling the vertical moving direction of the virtual body to deflect based on the position of the virtual target so that the moving direction of the virtual body is more toward the virtual target.

For example, in each frame, corresponding to the movement of the virtual target 103 in the vertical direction, for example, the enemy's jumping, flying, climbing, uphill and downhill, etc., control the moving direction of the bullet 107 in the vertical direction to deflect, the control method is similar to the method for controlling the movement of the virtual body in the horizontal direction according to the embodiment of the present application. The tracking effect of the virtual body in the vertical direction can be achieved.

Figure 7:
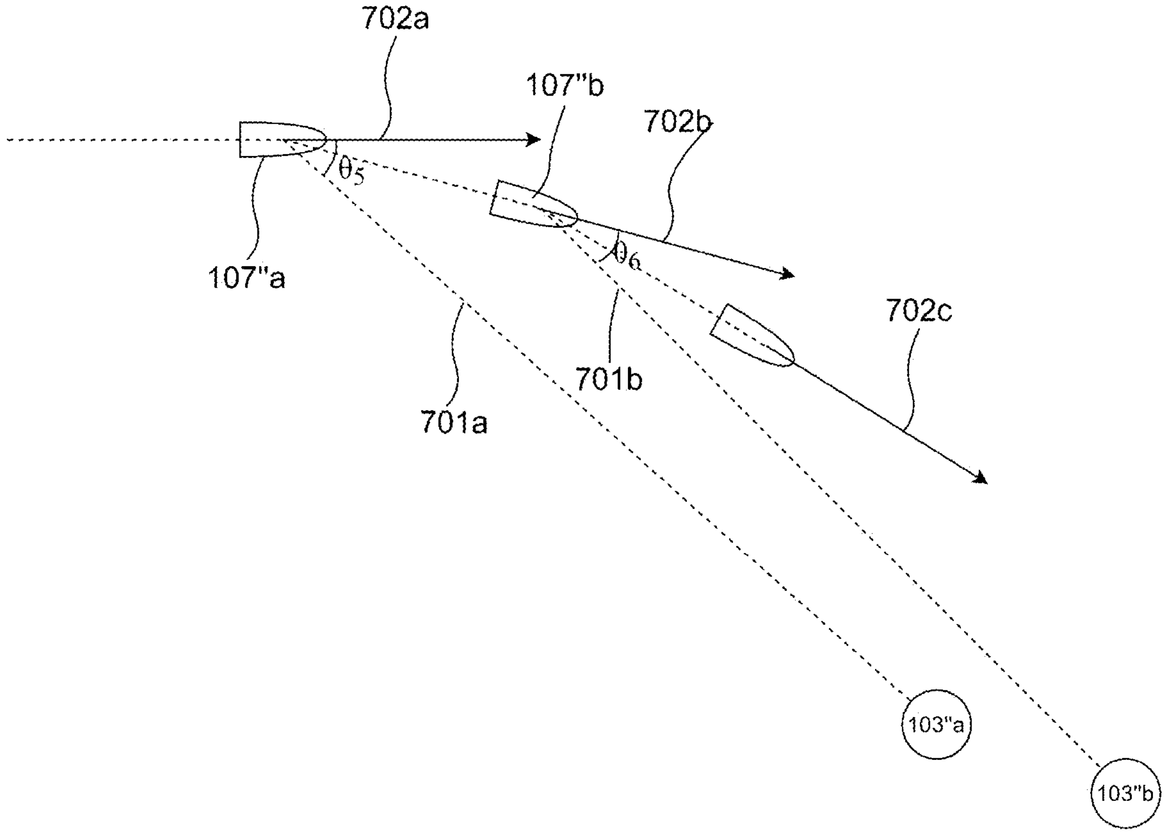
FIG. 7 shows a schematic diagram of a dynamic adjustment in the vertical direction according to an embodiment of this invention.

For example, FIG. 7 shows the vertical projection 107"*a* of the bullet 107 on the vertical plane, and the vertical projections 103"*a*, 103"*b* of the virtual object 103 on the vertical plane, and the moving direction 702*a* of the vertical projection of the bullet 107 on the vertical plane is represented by a directed line segment or vector. The vertical plane can be the vertical plane where the vector of the bullet 107 in the three-dimensional space is located in the first frame. The vertical plane can be the vertical plane where the connecting line between the bullet 107 and the virtual target is located in the current frame. The vertical plane can be the vertical plane where the vector of the moving direction of the bullet 107 in the three-dimensional space in the current frame is located. Or the vertical plane can be any other suitable vertical plane. For example, in the Nth frame, the connecting line between the vertical projection 107"*a* of the bullet 107 on any vertical plane and the vertical projection 103"*a* of the virtual object 103 on the vertical plane is 701*a*. The moving direction of the projection 107"*a* is 702*a*, and the included angle between the vertical moving direction of the bullet 107 and the direction of the connection line is the included angle $\theta_5$ between the moving direction 702*a* and the connecting line 701*a*. Then, based on the included angle $\theta_5$, the vertical moving direction of the bullet 107 is adjusted according to a predetermined angle, so that the moving direction of the bullet 107 on the vertical projection of the vertical plane is deflected toward the direction of the connecting line 701*a*, and deflected into the moving direction 702*b*. Therefore, in the N+1th frame, the virtual object 103 may have moved, and its vertical projection on the vertical plane is 103"*b*, and the connecting line between the vertical projection 107"*b* of the moved bullet 107 on the vertical plane and the vertical projection 103"*b* of the virtual object 103 on the horizontal plane is 701*b*, the moving direction of the projection 107"*b* is 702*b*, and the included angle between the vertical moving direction of the bullet 107 and the direction of connecting line is the included angle $\theta_6$ between the moving direction 702*b* and the connecting line 701*b*. Then, based on the included angle $\theta_6$, the vertical moving direction of the bullet 107 is adjusted, so that the moving direction of the bullet 107 on the vertical projection of the vertical plane is deflected toward the direction of the connecting line 701*b* according to a predetermined angle, and the deflected into the moving direction 702*c*. Subsequent frames are also deduced by analogy, so that in each frame, the moving direction of the vertical projection of the bullet 107 on the vertical plane is deflected toward the vertical projection of the virtual object 103 on the vertical plane, that is, the vertical moving direction of the bullet 107 is dynamically deflected toward the virtual object 103, achieving the dynamic tracking effect of the bullet in the vertical direction.

The first embodiment is a method embodiment corresponding to the present embodiment, which can be implemented in cooperation with the first embodiment. The relevant technical details mentioned in the first embodiment are still valid in the present embodiment, and in order to reduce repetition, details are not described herein. Accordingly, the relevant technical details mentioned in the present embodiment may also be applied to the first embodiment.

Figure 8:
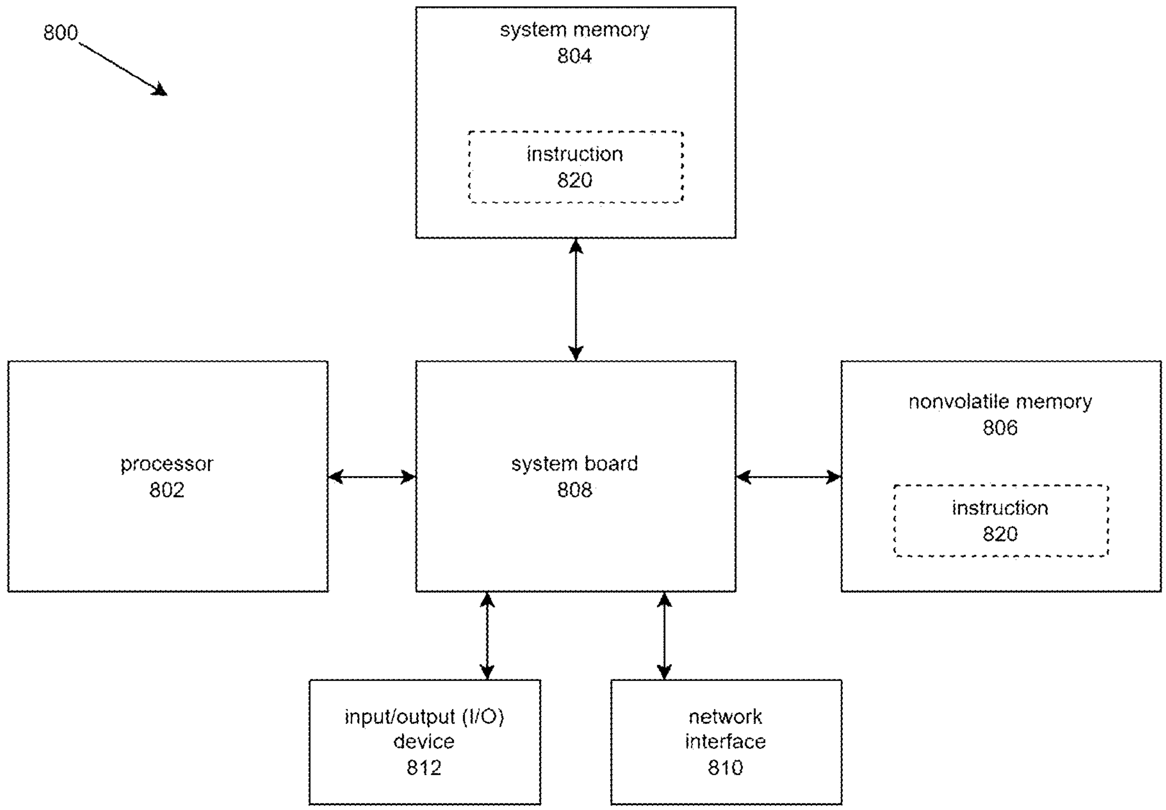
FIG. 8 is a hardware structural block diagram of an electronic device implementing controlling the movement of a virtual body according to an embodiment of this invention.

FIG. 8 is a hardware structural block diagram of an electronic device implementing controlling the movement of a virtual body according to an embodiment of this invention.

As shown in FIG. 8, an electronic device 800 may include one or more processors 802, a system board 808 connected to at least one of the processors 802, a system memory 804 connected to the system board 808, a nonvolatile memory (NVM) 806 connected to the system board 808, and a network interface 810 connected to the system board 808.

The processor 802 may include one or more single-core or multi-core processors. The processor 802 may include any combination of a general-purpose processor and a special-purpose processor (such as, a graphics processing unit, an application processor, or a baseband processor). In an embodiment of this invention, the processor 802 may be configured to perform one or more embodiments according to various embodiments shown in FIGS. 1-7.

In some embodiments, the system board 808 may include any suitable interface controller, to provide any suitable interface for at least one of the processors 802 and/or any suitable device or component communicating with the system board 808.

In some embodiments, the system board 808 may include one or more memory controllers to provide an interface connected to the system memory 804. The system memory 804 may be used to load and store data and/or an instruction. In some embodiments, the system memory 804 of the electronic device 800 may include any suitable volatile memory, such as a suitable dynamic random access memory (DRAM).

NVM 806 may include one or more tangible and non-transitory computer-readable media for storing data and/or the instruction. In some embodiments, NVM 806 may include any suitable nonvolatile memory such as a flash memory and/or any suitable nonvolatile storage device, such as a HDD (Hard Disk Drive, hard disk drive), a CD (Compact Disc, Compact Disc) drive, a DVD (Digital Versatile Disc, Digital Versatile Disc) drive.

NVM 806 may include a portion of storage resources installed on the apparatus of the electronic device 800, or may be accessed by a device, but is not necessarily part of a device. For example, NVM 806 may be accessed over a network via the network interface 810.

In particular, the system memory 804 and the NVM 806 may respectively include: a temporary copy and a permanent copy of the instruction 820. The instruction 820 may include: an instruction that causes the electronic device 800 to implement the method shown in FIGS. 1-7 when executed by at least one of the processors 802. In some embodiments, the instruction 820, hardware, firmware, and/or software components thereof may additionally/alternatively reside in the system board 808, the network interface 810, and/or the processor 802.

The network interface 810 may include a transceiver for providing a radio interface for the electronic device 800 to communicate with any other suitable devices (such as, a front-end module and an antenna) by using one or more networks. In some embodiments, the network interface 810 may be integrated with other components of the electronic device 800. For example, the network interface 810 may be integrated into at least one of the processor 802, the system memory 804, the NVM 806, and a firmware device (not shown) having an instruction, and when at least one of the processors 802 executes the instruction, the electronic device 800 implements one or more of the various embodiments shown in FIGS. 1-7.

The network interface 810 may further include any suitable hardware and/or firmware to provide a multiple-input multiple-output wireless interface. For example, the network interface 810 may be a network adapter, a wireless network adapter, a telephone modem, and/or a wireless modem.

In one embodiment, at least one of the processors 802 may be packaged with one or more controllers used for the system board 808 to form a system in a package (SiP). In one embodiment, at least one of the processors 802 may be integrated on the same die with one or more controllers used for the system board 808 to form a system on a chip (SoC).

The electronic device 800 may further include: an input/output (I/O) device 812 connected to the system board 808. The I/O device 812 may include a user interface, so that a user can interact with the electronic device 800; peripheral components can also interact with the electronic device 800 by using a design of a peripheral component interface. In some embodiments, the electronic device 800 further includes a sensor for determining at least one of environmental conditions and location information related to the electronic device 800.

In some embodiments, the I/O device 812 may include, but is not limited to, a display (such as, a liquid crystal display and a touch screen display), a speaker, a microphone, one or more cameras (such as, a still image camera and/or a video camera), a flashlight (such as, a LED flash), and a keyboard.

In some embodiments, the peripheral component interface may include, but is not limited to, a nonvolatile memory port, an audio jack, and a power interface.

In some embodiments, sensors may include, but are not limited to, gyroscope sensors, accelerometers, proximity sensors, ambient light sensors, and positioning units. The positioning unit may also be part of or interact with the network interface 810 to communicate with components of the positioning network, such as Global Positioning System (GPS) satellites.

It can be understood that, the structure illustrated in the embodiment of the present invention does not constitute a specific limitation on the electronic device 800. In other embodiments of the present application, the electronic device 800 may include more or fewer components than those shown in the figure, or combine some components, or split some components, or have different component arrangements. The illustrated components may be implemented in hardware, software, or a combination of software and hardware.

Program code can be applied to input instructions to perform the functions described in the present invention and to generate output information. The output information may be applied to one or more output devices in a known manner. For purposes of the present application, a system used for processing the instructions and including the processor 802 includes any system with a processor such as a digital signal processor (DSP), a microcontroller, an application specific integrated circuit (ASIC), or a microprocessor.

The program code can be implemented in a high-level programming language or an object-oriented programming language to communicate with a processing system. The program code can also be implemented in an assembly language or a machine language, if desired. In fact, the mechanism described in the present invention is not limited in scope to any particular programming language. In either case, the language may be an assembly language or an interpreted language.

One or more aspects of at least one embodiment may be implemented by instructions stored on a computer-readable storage medium that, when read and executed by a processor, enable an electronic device to implement the methods of the embodiments described in this invention.

According to some embodiments of the present application, disclose a computer storage medium having stored thereon instructions which, when run on a computer, cause the computer to perform any of the possible methods of the first embodiment described above.

The first embodiment is a method embodiment corresponding to the present embodiment, which can be implemented in cooperation with the first embodiment. The relevant technical details mentioned in the first embodiment are still valid in the present embodiment, and in order to reduce repetition, details are not described herein. Accordingly, the relevant technical details mentioned in the present embodiment may also be applied to the first embodiment.

According to some embodiments of the present application, disclose a computer program product including computer-executable instructions executed by a processor to implement the method for controlling the movement of a virtual body according to the embodiment of this invention.

The first embodiment is a method embodiment corresponding to the present embodiment, which can be implemented in cooperation with the first embodiment. The relevant technical details mentioned in the first embodiment are still valid in the present embodiment, and in order to reduce repetition, details are not described herein. Accordingly, the relevant technical details mentioned in the present embodiment may also be applied to the first embodiment.

It should be understood that the specific embodiments described herein are used merely to explain the present application, but are not intended to limit the present application. In addition, for ease of description, only some but not all structures or processes related to the present application are shown in the drawings. It should be noted that in this description, similar numerals and letters designate like items in the drawings.

It should be understood that although the terms first, second, etc. may be used in the present disclosure to describe various features, these features should not be limited to these terms. These terms are used for distinction only and shall not be understood as an indication or implication of relative importance. For example, without departing from the scope of example embodiments, a first feature may be referred to as a second feature, and similarly a second feature may be referred to as a first feature.

In the description of the present application, it is also to be noted that, unless expressly stated and defined otherwise, the terms "arrangement", "connection", "link" are to be understood in a broad sense, for example, as a fixed connection, as a detachable connection, or as an integrated connection; may be a mechanical connection or an electrical connection; may be directly connected or indirectly connected by means of an intermediate medium, and may be internal communication of the two elements. The specific meaning of the above terms in this embodiment will be understood by one of ordinary skill in the art.

Illustrative embodiments of the present application include, but are not limited to, method, device, medium and computer program product for controlling the movement of a virtual body.

Various aspects of the illustrative embodiments are described by using terms commonly used by persons skilled in the art to convey the substance of their work to others skilled in the art. However, it is apparent to the persons skilled in the art that some alternative embodiments may be practiced by using some of the described features. For purposes of explanation, specific numbers and configurations are set forth in order to provide a more thorough understanding of the illustrative embodiments. However, it is apparent to the persons skilled in the art that alternative embodiments may be practiced without the specific details. In other instances, well-known features have been omitted or simplified herein in order to avoid obscuring the illustrative embodiments of the application.

In addition, various operations will be described as a plurality of operations separated from each other in a manner most conducive to understanding the illustrative embodiments; however, the order of description should not be construed as to imply that these operations are necessarily dependent on the order of description, many of which operations may be performed in parallel, concurrently, or simultaneously. In addition, the order of operations can also be rearranged. When the described operations are completed, the processing may be terminated, but may further have additional steps not included in the figures. The processing may be corresponding to a method, a function, a procedure, a subroutine, a subprogram, or the like.

References in the specification to "an embodiment", "embodiment", "illustrative embodiment" and the like indicate that the described embodiments may include specific features, structures or properties, but each embodiment may or may not necessarily include specific features, structures or properties. Moreover, these phrases do not necessarily refer to the same embodiment. Furthermore, when certain features are described with reference to specific embodiments, the knowledge of the persons skilled in the art can affect the combination of these features with other embodiments, whether or not those embodiments are explicitly described.

Unless the context otherwise requires, the terms "comprising," "having," and "including" are synonyms. The phrase "A and/or B" indicates "(A), (B) or (A and B)".

As used herein, the term "module" may refer to, be a part of, or include: a memory (shared, dedicated, or group), an application-specific integrated circuit (ASIC), an electronic circuit, and/or a processor (shared, dedicated, or a group) that can execute one or more software or firmware programs, a combinatorial logic circuit, and/or another proper component that provides the function.

In the drawings, some structural or methodological features may be shown in a particular arrangement and/or order. However, it should be understood that no such specific arrangement and/or ordering is required. Rather, in some embodiments, features may be described in a different manner and/or order than shown in the illustrative figures. In addition, the inclusion of structural or methodological features in a particular figure does not imply that all embodiments need to include such features, and in some embodiments, these features may not be included or may be combined with other features.

In some cases, the disclosed embodiments may be implemented in hardware, firmware, software, or any combination thereof. The disclosed embodiments may also be implemented in the form of instructions or programs carried or stored on one or more transient or non-transient machine-readable (e.g., computer-readable) storage media, which may be read and executed by one or more processors or the like. When instructions or programs are run by a machine, the machine may perform the various methods described above. For example, the instructions may be distributed over a network or other computer-readable medium. Thus, a machine-readable medium may include, but is not limited to, any mechanism for storing or transmitting information in a form readable by a machine (e.g., a computer), such as a floppy disk, an optical disk, an optical disk read-only memory (CD-ROMs), a magneto-optical disk, a read-only memory (ROM), a random access memory (RAM), an erasable programmable read-only memory (EPROM), an electronically erasable programmable read-only memory (EEPROM), a magnetic or optical card, or a flash or tangible machine-readable memory for transmitting network information through electrical, optical, acoustic, or other forms of signals (e.g., a carrier wave, an infrared signal, a digital signal, etc.). Thus, a machine-readable medium includes any form of machine-readable medium suitable for storing or transmitting electronic instructions or machine (e.g., computer) readable information.

The embodiments of the present application have been described in detail above in connection with the drawings, but the use of the technical solutions of the present application is not limited to the various applications mentioned in the examples of the present patent, and various structures and variations can be readily implemented with reference to the technical solutions of the present application to achieve the various advantages mentioned herein. Various changes made without departing from the purpose of the present application shall fall within the scope of the patent of the present application, within the knowledge of one of ordinary skill in the art.

The invention claimed is:

1. A method for controlling the movement of a virtual body applied to an electronic device, including:

a target determining step, in the first frame, based on the moving direction and position of the virtual body, selecting a virtual object in a predetermined area as a virtual target;

a dynamic adjusting step, calculating a horizontal moving direction of the virtual body, a direction of a connecting line between a vertical projection of the virtual body on the horizontal plane and a vertical projection of the virtual target on the horizontal plane, and an included angle between the horizontal moving direction of the virtual body and the direction of the connecting line in each frame, and controlling the horizontal moving direction of the virtual body based on the included angle, wherein, if the included angle is less than a predetermined angle threshold, controlling the horizontal moving direction of the virtual body to deflect a predetermined angle toward the direction of the connecting line based on the horizontal moving direction of the previous frame, if the included angle is greater than or equal to the predetermined angle threshold, controlling the horizontal moving direction of the virtual body to be the horizontal moving direction of the previous frame.

2. The method of claim 1, wherein the dynamic adjusting step further includes:

if the included angle is less than the predetermined angle, controlling the horizontal moving direction of the virtual body to deflect an angle toward the direction of the connecting line based on the horizontal moving direction of the virtual body in the previous frame, wherein the deflected angle is equal to the included angle.

3. The method of claim 1, further including a charge operation step:

receiving a charge operation of a user, there is a predetermined relationship between the predetermined angle and the frame number, and the predetermined angle is positively correlated with the duration of the charge operation.

4. The method of claim 1, wherein the target determining step further includes: the vertical projection of the predetermined area on the horizontal plane is a sector area, wherein the sector area has a predetermined central angle, an angle bisector of the sector area is parallel to the horizontal moving direction of the virtual body in the first frame, the sector area takes the predetermined firing range of the virtual body as the radius, and takes the vertical projection of the position of the virtual body on the horizontal plane in the first frame as the apex.

5. The method of claim 3, wherein in the target determining step, selecting a virtual object in a predetermined area as a virtual target includes:

selecting a virtual object within the predetermined area, which has no obstacles between the positions of the virtual object and the virtual body in the first frame, and the vertical projection of whose position on the horizontal plane is the closest to the vertical projection of the position of the virtual body on the horizontal plane in the first frame, as the virtual target.

6. The method of claim 1, further including a charge operation step:

receiving a charge operation of a user, the velocity magnitude of the virtual body in the first frame is positively correlated with the duration of the charge operation, and the velocity magnitude of the virtual body decays in a predetermined proportion with time, and when the velocity magnitude of the virtual body is 0, stop controlling the movement of the virtual body.

7. The method of claim 1, further including a charge operation step:

receiving a charge operation of a user, creating the virtual body after the charge operation ends if the duration of the charge operation does not reach a predetermined duration threshold, when the duration of the charge operation reaches the predetermined duration threshold, entering a cooling time, and not responding the charge operation within the cooling time.

8. The method of claim 1, further including:

the movement parameters of the virtual body in the vertical direction are calculated according to the law of parabolic movement.

9. The method of claim 1, further including:

controlling the vertical moving direction of the virtual body to deflect based on the position of the virtual target so that the moving direction of the virtual body is more toward the virtual target.

10. A device for controlling the movement of a virtual body, the device including a processor and a non-transitory memory storing computer-executable instructions which, when executed by the processor, cause the device to implement the method for controlling the movement of a virtual body according to claim 1.

11. A non-transitory computer storage medium having stored thereon instructions which, when run on a computer, cause the computer to perform the method for controlling the movement of a virtual body according to claim 1.

12. A non-transitory computer program product including computer-executable instructions executed by a processor to implement the method for controlling the movement of a virtual body according to claim 1.

* * * * *